United States Patent
Pandharipande et al.

(10) Patent No.: US 10,880,973 B2
(45) Date of Patent: Dec. 29, 2020

(54) SENSOR CONTROL DEVICE

(71) Applicant: SIGNIFY HOLDING B.V., Eindhoven (NL)

(72) Inventors: Ashish Vijay Pandharipande, Eindhoven (NL); David Ricardo Caicedo Fernández, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/632,461

(22) PCT Filed: Jul. 10, 2018

(86) PCT No.: PCT/EP2018/068592
§ 371 (c)(1),
(2) Date: Jan. 20, 2020

(87) PCT Pub. No.: WO2019/016019
PCT Pub. Date: Jan. 24, 2019

(65) Prior Publication Data
US 2020/0229285 A1 Jul. 16, 2020

(30) Foreign Application Priority Data
Jul. 18, 2017 (EP) .................................. 17181848

(51) Int. Cl.
*H05B 47/115* (2020.01)
*H05B 47/11* (2020.01)

(52) U.S. Cl.
CPC .......... *H05B 47/115* (2020.01); *H05B 47/11* (2020.01)

(58) Field of Classification Search
CPC ...... H05B 47/115; H05B 47/11; H05B 45/10; G05B 19/042
See application file for complete search history.

(56) References Cited

U.S. PATENT DOCUMENTS

| | | | |
|---|---|---|---|
| 9,521,009 B1* | 12/2016 | Skeffington | H04L 12/2827 |
| 2009/0072945 A1 | 3/2009 | Pan et al. | |
| 2016/0007426 A1* | 1/2016 | Ashdown | G05B 13/048 |
| | | | 700/90 |
| 2016/0381439 A1 | 12/2016 | Satoh et al. | |
| 2017/0345208 A1* | 11/2017 | Ashdown | G06F 30/20 |

FOREIGN PATENT DOCUMENTS

| | | |
|---|---|---|
| EP | 2987390 B1 | 11/2017 |
| JP | 2013214461 A | 10/2013 |

* cited by examiner

Primary Examiner — Daniel D Chang
(74) Attorney, Agent, or Firm — Meenakshy Chakravorty

(57) ABSTRACT

Some embodiments are directed to a sensor control device (200) for a connected lighting system (100), said connected lighting system comprising multiple luminaires (122) arranged in a region, the sensor control device obtaining from received sensor data the occupant locations in sub-regions associated with the sensor data and/or multiple illuminance levels for multiple points in the sub-region, and defines a virtual sensor at a virtual sensor location. The occupancy state and/or illuminance level from the virtual sensor are used to control a luminaire of the multiple luminaires, the luminaire covering the virtual sensor location in the region.

14 Claims, 12 Drawing Sheets

SENSOR CONTROL DEVICE

CROSS-REFERENCE TO PRIOR APPLICATIONS

This application is the U.S. National Phase application under 35 U.S.C. § 371 of International Application No. PCT/EP2018/068592, filed on Jul. 10, 2018, which claims the benefit of European Patent Application No. 17181848.7, filed on Jul. 18, 2017. These applications are hereby incorporated by reference herein.

FIELD OF THE INVENTION

The invention relates to a sensor control device for a connected lighting system, a connected lighting system, a sensor control method for a connected lighting system, and a computer readable medium.

BACKGROUND

European patent application EP2987390, with title "Calibrating operation of a lighting device" (included herein by reference) discloses a known light system. The known light system comprises one or more luminaires. The luminaires are arranged to emit artificially generated light into a space. The space will tend to include some amount of ambient light, such as daylight or other natural light, at least at some times of day.

Each luminaire comprises a respective light sensor, a presence sensor and a controller associated with each respective lighting device. The respective presence sensor is arranged to sense the presence of a being (typically a human user) in a region of the space illuminated by the respective lighting device. The lights are controlled based on the detected presence, and may be arranged to dim in a granular fashion, i.e., per individual luminaire. Each controller controls the light of its respective lighting device based on its respective light sensor. To do this the controller is calibrated, so as to be able to control the light emitted from the device to provide a specified light level at a certain point or height within the room or other space, e.g., in a workspace plane such as desk height.

SUMMARY OF THE INVENTION

A sensor control device for a connected lighting system is provided. The connected lighting system comprises multiple luminaires arranged in a region. The sensor control device comprises
- a receiving unit arranged to receive sensor data from multiple sensors arranged in the region, each sensor being associated with a sub-region comprised in the region, the sensor data being indicative of one or more occupant locations of occupants in the sub-region and/or multiple illuminance levels at multiple different points in the sub-region,
- a virtual sensor location storage storing a virtual sensor location in the region of a virtual sensor for occupancy and/or illuminance,
- a processing unit arranged to
  obtain from the received sensor data the occupant locations in the sub-region associated with the sensor data and/or the multiple illuminance levels for the multiple points in the sub-region associated with the sensor data,
  integrate occupancy states for the multiple occupant locations and/or the multiple illuminance levels for the multiple points into an integrated region-wide occupancy and/or illuminance map,
  define a virtual sensor at the virtual sensor location and compute an occupancy state and/or illuminance level for the virtual sensor from the virtual sensor location and the integrated occupancy and/or illuminance map,
  use the occupancy state and/or illuminance level from the virtual sensor to control a luminaire of the multiple luminaires, the luminaire covering the virtual sensor location in the region.

By defining virtual sensors based on the received sensor information, the physical location of the sensors is independent of the location used for controlling luminaires. This gives great flexibility when a lighting setup is reorganized. Without moving the physical sensors, a new control mapping can be created based on occupancy or illumination at different positions. Furthermore, one may even change lighting control using conventional lighting controllers, that expect sensor information at an input. The lighting controllers may be oblivious to the fact that the sensor information does not come from a physical sensor directly, but from a virtual sensor.

Moreover, the system may be used to reduce the number of sensors used. For example, with a few sensors that cover a larger area, but give information on multiple occupants and/or multiple illumination levels, individual sensors for each luminaire are not needed. In particular, the system may be used with luminaires that do not have their own sensors. This allows modern smart connected lighting systems to be used with conventional luminaires without integrated sensors. At the same time, advanced and more complicated control mappings may still be used. For example, in an example one may want to reduce lighting if a certain part of the office is not occupied. However, if people are in an adjacent region the lighting may be reduced to a higher level, than if no people are in an adjacent region.

The sensor control device is an electronic device. For example, the sensor control device may be implemented in a computer or server. The sensor control device could also be integrated in a lighting controller. A sensor control device or a sensor control method as described herein may be applied in a wide range of practical applications. Such practical applications include offices, hospitals, public places, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a connected lighting system, FIG. 2 schematically shows an example of an embodiment of a control process, FIG. 3 schematically shows an example of an embodiment of a connected lighting system, FIG. 4a schematically shows an example of an embodiment of luminaires in an open office space, FIG. 4b schematically shows an example of an embodiment of physical sensors in an open office space, FIG. 4c schematically shows an example of an embodiment of office furniture in an open office space, FIG. 4d schematically shows an example of an embodiment of virtual sensors an open office space, FIG. 4e schematically shows an overlay of FIGS. 4c and 4d, FIG. 4f schematically shows an example of an embodiment of office furniture in an open office space, FIG. 4g schematically shows an example of an embodiment of virtual sensors an open office space, FIG. 4h schematically shows an overlay of FIGS. 4f and 4g, FIG. 5a schematically shows an example of an embodiment of an integrated region-wide occupancy map, FIG. 5b schematically shows an example of an embodiment of clusters in an integrated region-wide occupancy map for an open office space, FIG. 5c schematically shows an example of an embodiment of virtual sensors in an open office space, FIG. 5d schematically shows an example of an embodiment of control zones for an open office space, FIG. 6a schematically shows an example of an embodiment of virtual sensors and luminaires in an open office space, FIG. 6b schematically shows an example of an embodiment of an added luminaire and virtual sensor, FIG. 7a schematically shows an example of an embodiment of two physical sensors with overlapping sub-regions, FIG. 7b schematically shows an example of an embodiment of two physical sensors with overlapping sub-regions, FIG. 8 schematically shows an example of an embodiment of a sensor control method, FIG. 9a schematically shows a computer readable medium having a writable part comprising a computer program according to an embodiment, FIG. 9b schematically shows a representation of a processor system according to an embodiment.

DETAILED DESCRIPTION OF PREFERRED EMBODIMENTS

Figure 1:
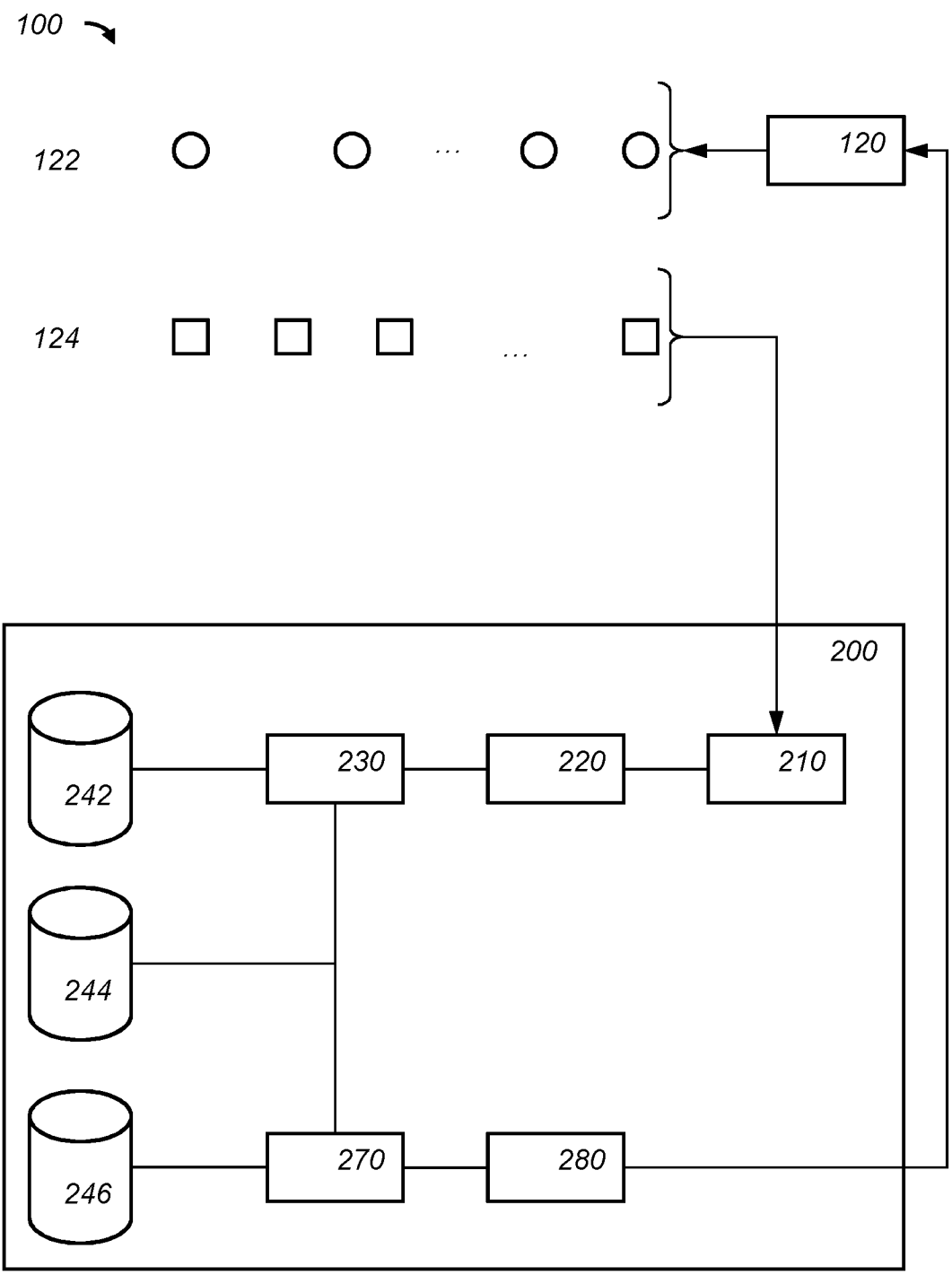

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

FIG. 1 schematically shows an example of an embodiment of a connected lighting system 100. Connected lighting system 100 comprises multiple luminaires 122 and multiple sensors 124 arranged in a region. Connected lighting system 100 further comprises a sensor control device 200. The embodiment shown in FIG. 1 further comprises a light controller 120. Note embodiments without light controllers are also possible.

For example, the region may comprise an interior region of a building such as an office, laboratory, shop floor or other room; or may comprise an outdoor region such as a garden, park, square, plaza or stadium; or a covered region such as a gazebo. The region may also be an open office. Several examples of embodiments in which the region is an open office are given below; the skilled person may adapt such examples to other regions.

The multiple luminaires 122 may take the form of integrated fixtures of the room or free-standing units. Each luminaire comprises a respective lighting device such as an LED (light emitting diode) or electric filament, along with any associated fixture or fitting. For example, a luminaire may be mounted on a ceiling of a room, or wall. The lighting device of each luminaire is arranged to emit artificially generated light into the region. Further, the region will tend to include some amount of ambient light, such as daylight or other natural light, at least at some times of day. For example, if the region is a room, it will typically comprise one or more openings such as a window, e.g., a window in a side wall of the room and/or a skylight. The window admits other light into the room from the exterior, principally natural light comprising daylight from the sun.

Figure 3:
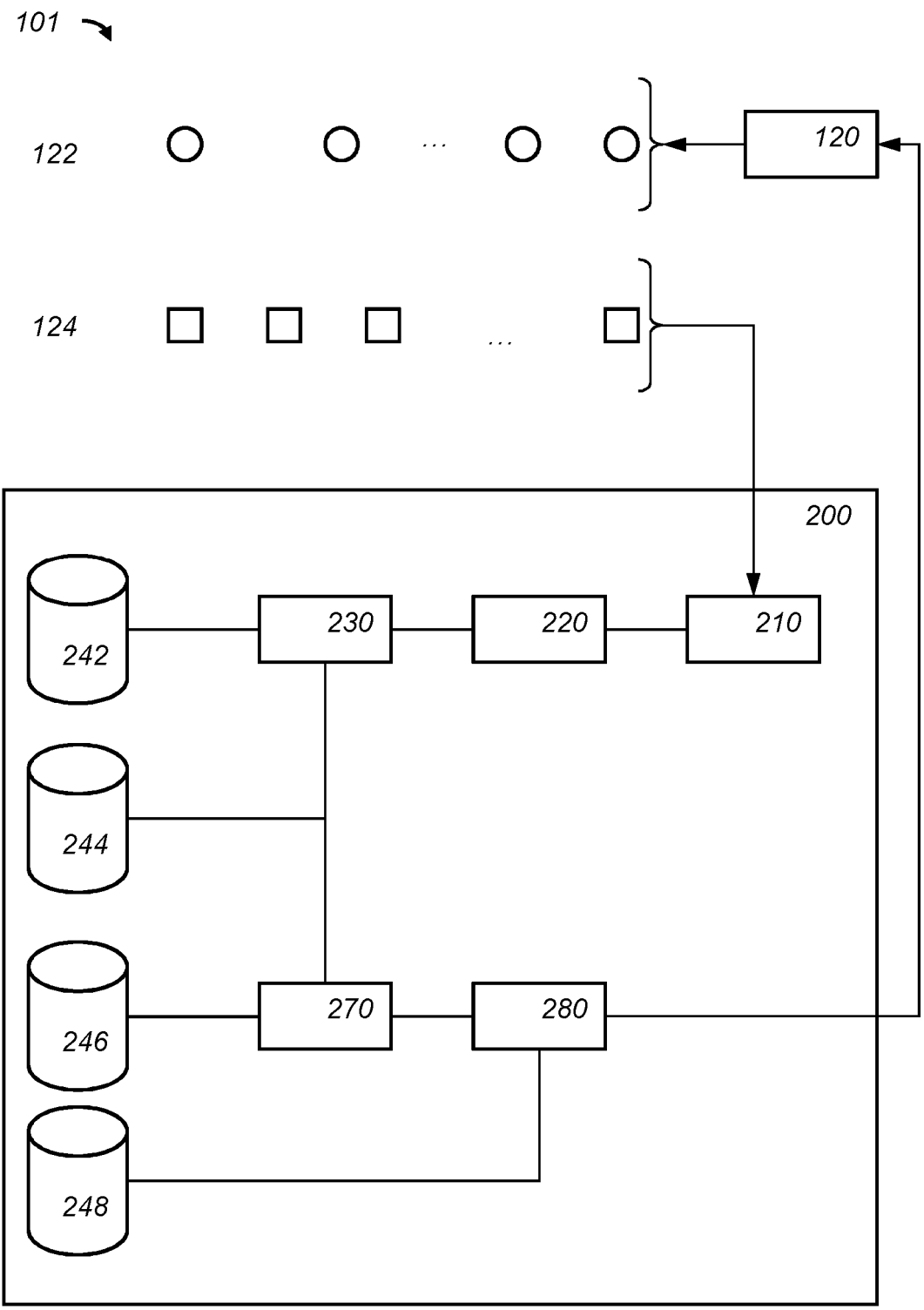

Sensor control device 200 comprises a processing unit arranged to execute the activities of the sensor control device. Examples of processing units are shown herein. FIGS. 1 and 3 show functional units that may be functional units of the processor circuit. For example, FIGS. 1 and 3 may be used as a blueprint of a possible functional organization of the processor circuit. The processor circuit is not shown separate from the units in these figures. For example, the functional units shown in the figures may be wholly or partially be implemented in computer instructions that are stored at device 200, e.g., in an electronic memory of device 200, and are executable by a microprocessor of device 200. In hybrid embodiments, functional units are implemented partially in hardware, e.g., as coprocessors, and partially in software stored and executed on device 200.

Connected lighting system 100 comprises multiple sensors arranged in the region. Each sensor is associated with a sub-region comprised in the region. The sensor may be an occupancy sensor or an illumination sensor, or both. An occupancy sensor senses the presences of individuals in the sub-region. An illumination sensor senses the illumination level in the sub-region. The sensor is arranged to encode the sensed information in sensor data. Typically, the sensor data is digital data transmitted over a digital message network to sensor control device 200. For example, a sensor may comprise a digital transmitter for periodically sending sensors data to sensor control device 200. In an embodiment, the sensor data is reported to sensor control device 200 along with the sensor ID and an optional timestamp.

As an occupancy sensor, the sensor data is indicative of one or more occupant locations of occupants in the sub-region. In other words, the sensor is arranged to detect the location relative to the sensor of the persons in the sub-region associated with the sensor. In an embodiment, the sensor is able to detect at least two people in the sub-region, though the sensor may be arranged to detect more people, e.g., 2 or more, 3 or more, etc. There may be a maximum; for example, a sensor may be limited to detect up to 10 different people, etc. This limitation may impact the accuracy of the system, but if the limit is large enough compared to the size of the sub-region this will generally not be a problem. In an embodiment, the sensor data is indicative for the location of multiple distinct individuals within the sub-region. In an embodiment, the sensor data is indicative for the illumination of multiple distinct points or cells within the sub-region. The illumination value for a cell, e.g., a small sub-sub-region in the sub-region may be averaged.

As an illumination sensor, the sensor data is indicative of multiple illuminance levels at multiple different points in the sub-region. For example, the sensor may detect and report illuminance levels at 8 or more points, 16 or more points, more than 128, etc.

These sensors are thus different from conventional sensors used in the known lighting system for lighting control, wherein occupancy values are binary and light sensor measurements indicate illumination for a single point or a single average for a sub-region.

One, more than one, or even all of the sensors may be multi-modal sensors. A multi-modal sensor is arranged to provide sensor data indicative for multiple distinct occupant locations and for multiple distinct illuminance levels at multiple different points in the sub-region. In other words, using a single multi-modal sensor, there is no need to have separate occupancy and illuminance sensors. Embodiments described herein may be adapted to multi-modal sensors by replacing a separate occupancy and illumination sensor with a single multi-modal sensor; or the other way around, an embodiment using multi-modal sensors could be adapted by replacing the multi-modal sensor with a separate occupancy and illumination sensor.

In an embodiment, the multi-modal sensor, e.g., a camera based visual sensor has a high spatial granularity at which data is generated. For example, a conventional illumination or occupancy sensor typically average out of a relatively large area. For example, a high granularity multi-modal sensor may have a granularity of 1 measurement per square centimeter of floor space or better, e.g., office floor space.

Some or all of the sensors may be integrated with a luminaire, but this is not necessary. For example, the sub-region may be related to the coverage of a luminaire, e.g., the same; but this need not be the case. In fact, the sensors may be installed as an upgrade for a lighting system. In an embodiment, the sensors, especially multi-modal sensors may be installed independent of the luminaires and/or separate therefrom. Typically, the sub-region associated with a sensor will be larger, even much larger, than coverage of the luminaires.

The occupancy and/or illumination sensors may be vision sensors; for example, these sensors may comprise a camera for recording an image of the sub-region. For example, the sensors could be installed in a ceiling of the region.

The sensor data could be raw, e.g., raw measured data which need further processing downstream. For example, the sensor data may comprise digital images recorded by the sensor. The sensor data could also be processed, e.g., as indicated below. The latter has the advantage of significantly reducing the bandwidth requirements of the system. For example, the sensors may generate data in the form of user positions and illuminance values for multiple points or grid-cells within its sensing region. The points or cells may be at a pre-defined spatial granularity. In an embodiment, the sensor data generated by a sensor comprises a sequence of sub-region-wide coordinates indicating the occupant locations and/or of illuminance levels for the multiple points, occupant locations and/or points being relative to the sensor.

Processing of visual data, e.g., a digital image for illuminance may use methods known in the art, per se. For example, the paper "Detecting Illumination in Images", by Graham Finlayson et al. discloses a method for detecting illumination, e.g., determining which pixels are lit by different lights, in images. The method uses a sensor comprising a chromagenic camera. The chromagenic camera takes two pictures of each scene: one is captured as normal and the other through a colored filter. The camera may be used for chromagenic illuminant estimation directly. This estimation may be improved using a combinatorial search.

Processing of visual data, e.g., a digital image for occupancy may also use methods known in the art, per se. For example, the paper "Illumination-Invariant Change Detection" by Daniel Toth, et al., discloses detection of moving objects in image sequences acquired by a static camera. The method analyzes the grey-level difference between successive frames. A motion detection algorithm is combined with a homomorphic filter which effectively suppresses variable scene illumination.

Processing of digital images may be done in the sensor, in which case the sensor data may comprises information which directly identifies individuals and illumination throughout the sub-region: For example, one or more coordinate pairs identifying individuals in the sub-regions and/or multiple illuminance values for multiple points in the sub-region. On the other hand, the processing may also be done at sensor control device 200.

Sensor control device 200 comprises a receiving unit 210. Receiving unit 210 is arranged to receive the sensor data from the multiple sensors 124. For example, sensors 124 and receiving unit 210 may communicate over a digital network, e.g., a local area network (LAN), e.g., comprising a Wi-Fi network, e.g., a ZigBee network, and the like. The digital network may be partly or wholly wireless, or partly or wholly wired. For example, may comprises a digital network receiver or sender/receiver etc., such as a Wi-Fi sender/receiver.

Sensor control device 200 comprises an input unit 220 arranged to obtain from the received sensor data the occupant locations in the sub-region associated with the sensor data and/or the multiple illuminance levels for the multiple points in the sub-region associated with the sensor data. Depending on the sophistication of the sensors, input unit 220 may be more or less complicated. For example, if most or all of the processing is done in the sensor, then input unit 220 may only need to parse the sensor data to obtain therefrom occupant locations, e.g., coordinates relative to the sensor, and/or to obtain therefrom illumination levels for multiple points, e.g., arranged as a sequence of illumination levels, or, as a sequence of coordinates and corresponding illumination levels, etc. On the other hand, the sensor may be less intelligent, in which case the input unit 210 may process the received sensor data to obtain the occupancy and illuminance values, e.g., by performing the processing mentioned above.

Sensor control device 200 comprises a sensor data aggregation unit 230. Sensor data aggregation unit 230 is arranged to convert the occupant locations and/or multiple points in the sub-regions to region-wide coordinates and integrate occupancy states for the multiple occupant locations and/or the multiple illuminance levels for the multiple points into an integrated region-wide occupancy and/or illuminance map. For example, sensor control device 200 may comprises a physical sensor location storage 242 which stores the physical location in the region of the multiple sensors 124. For example, storage 242 may associate sensor IDs with their location.

For example, in an embodiment the sensor may report sensor data such as {(−1, +3), (5, −4), (2, 3)} to indicate the detection of three individuals in the sub-region associated with the sensor. The coordinates are relative to the sensor and may be expressed in some suitable dimension, e.g., in meters, centimeters, and the like. Sensor data aggregation unit 230 may retrieve from physical sensor location storage 242 where this particular sensor, e.g., identified from a sensor ID received together with the sensor data, e.g. that this sensor is located at particular coordinates, say, (15, 13). The latter are region-wide coordinates, e.g., relative to a fixed orientation point in the region which is shared by all sensors. Sensor data aggregation unit 230 can convert the local sub-region wide coordinates to region-wide coordinates, e.g., by adding the local coordinates to coordinates of the sensor. In the latter case, the coordinates are converted to {(14, 16), (20, 9), (17, 16)}.

The situation for illumination values is similar. For example, the sensor may report {{(0,0), 430}, {(1, 0), 431}, {(0,1), 429}, ... } combining sub-region wide coordinates with illuminance levels. Translated to region wide coordinates these may become: {{(15,13), 430}, {(16, 13), 431}, {(15,14), 429}, ... }. The coordinates for which illumination is reported may be known in advance. For example, the sensor may simply report (430, 431, 429, ... ), if the sensor control device and the sensor have access to a predetermined list of locations, e.g., coordinates for the multiple points.

A sensor may also report on occupancy or illumination by including raw data in the sensor data, e.g., image data. For example, an image taken from a sensor includes the positions of individuals in the image. Image recognition software may be used to detect objects, in particular individuals in the image. The pixels of an image may correspond to particular coordinates relative to the sensor. For example, after an image has been received at the sensor control device, and individuals in the image have been recognized, the position of the individuals is known, e.g., as coordinates, relative to the sensor. The local coordinates may then be converted to region-wide coordinates.

After the local sub-region coordinates are converted, they are integrated in an integrated region-wide occupancy and/or illuminance map. For example, the integrated region-wide occupancy map and the integrated region-wide illuminance map may be implemented as a two-dimensional array, e.g., as a grid. The array positions may be written with the occupancy or illumination status. An array is convenient but not necessary, other data structures include a linked list. For example, in an embodiment a linked list is used for the integrated region-wide occupancy map and an array for the integrated region-wide illuminance map. The integrated maps may be stored in a map storage 244.

Figure 7A:
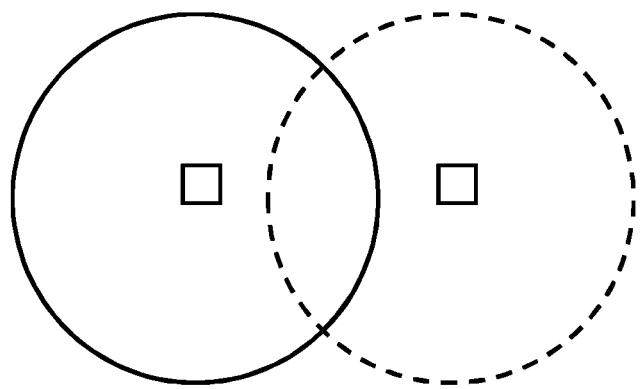
Figure 7B:
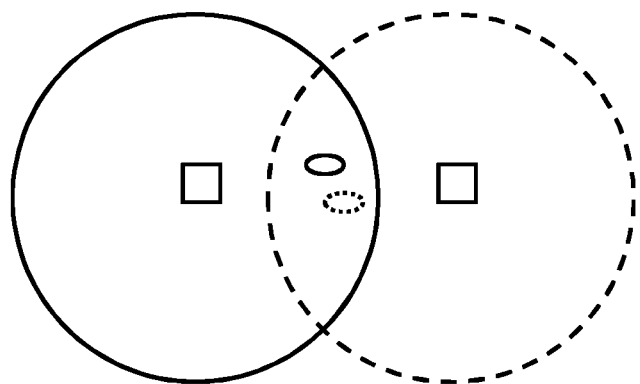

For the most part, the data reported by a sensor may be copied directly to the map. Some care may be needed to handle overlapping sensors. Such a situation is shown in FIG. 7*a*. FIG. 7*a* shows two sensors, indicated as small squares and their corresponding sub-region. For the left square, its sub-region is an undashed line, for the right square the sub-region is a dashed line. Shown in FIG. 7*b* are two individuals in the overlapping part of the sub-region. Both sensors detect the same individual, but at slightly different places. For example, the differences may be caused by measurement inaccuracies, e.g., caused by slight inaccuracies in the position of the sensors. The identification of the left sensor being indicated with an undashed oval, and of the right sensor by a dashed oval.

Sensor data aggregation unit 230 is arranged to apply a consolidation routine arranged to consolidate the sensor data in the overlapping part of the left and right sub-region. For example, in an embodiment, sensor data aggregation unit 230 is arranged to prioritize some sensors over others, in an overlapping region only the data of the prioritized sensor is used. For example, if the left sensor has a higher priority than the right sensor, the consolidation routine may ignore the data from the right sensor. This works for occupancy and illumination. For example, all sensors may be assigned a priority value, which may be used to determine which sensor to give priority. For example, all priority values may be different. For example, the priority values may be assigned randomly.

For example, in an embodiment, the consolidation routine is arranged to map the individuals identified in the left sensor to the individuals identified in the right sensor; for example, by mapping a left individual to the closest right individual. After the identification, the routine may average the coordinates of the individuals. In the case of FIG. 7*b* this would lead to an individual detected in between the left and right detected individual.

For illumination, a similar consolidation may be done. For example, the illumination levels in the overlapping region may be the average. The average may be weighted based on the distance to the left and right sensor in the overlapping region. This has the advantage that a smoother transition from the left to the right sensor is achieved. Other interpolation may be used, e.g., non-linear and/or polynomial interpolation.

Sensor control device 200 comprises a virtual sensor location storage 246 arranged to store the location of a virtual sensor in the region. Sensor control device 200 comprises a virtual sensor unit 270 that defines a virtual sensor at the virtual sensor location and computes an occupancy state and/or illuminance level for the virtual sensor from the virtual sensor location and the integrated occupancy and/or illuminance map.

In an embodiment, the occupancy status and/or illuminance may be directly read from the integrated map. In case the granularity of the location of the virtual sensor differs from the granularity in the map interpolation may be used. The denser the number of points with respect the region where measurements are available, the more accurate the value of the virtual sensor will be.

For example, to compute an occupancy state from the virtual sensor location and the integrated occupancy map for the region, virtual sensor unit 270 may select from the integrated occupancy map occupancy states obtained for points in a further sub-region around the virtual sensor location, the virtual sensor being assigned an occupied state if any one of the selected occupancy states indicates occupancy. For example, virtual sensor unit 270 draws a virtual circle in the integrated map using as center the location of the virtual sensor and as radius a predetermined value indicating the further sub-region. If the map indicates occupancy for any of the points in the virtual circle, the virtual sensor is assigned the value occupied, and else it is assigned the value not-occupied.

For example, to compute an illuminance level from the virtual sensor location and the integrated illuminance map for the region, virtual sensor unit 270 may obtain from the integrated map illuminance levels obtained for points in a further sub-region around the virtual sensor location, the virtual sensor being assigned an illuminance level by interpolating from the selected illuminance levels. The illumination may be averaged over the further sub-region. The two further sub-regions for occupancy and illumination need not be the same.

In an embodiment a diameter of the virtual circle, or virtual measurement area, is chosen larger that the smallest distance between measurement points reported by the physical sensors.

Sensor control device 200 comprises a light controller output 280 arranged to use the occupancy state and/or illuminance level from the virtual sensor to control a luminaire of the multiple luminaires, the luminaire covering the virtual sensor location in the region. For example, control may be direct, e.g., by directly sending a digital command to a luminaire instructing it to increase or decrease illumination level. The virtual sensor information, e.g., occupancy and/or illuminance levels may also be directly sent to a luminaire. The luminaire can then use the values as if they were inputs obtained from real sensors, and increase or decrease illumination level accordingly. FIG. 1 shows yet a different embodiment, in which an existing lighting network infrastructure is used.

FIG. 1 shows a light controller 120. Light controller 120 may be conventional and arranged to control luminaires arranged in one or more control zones on the basis of sensor inputs. However, light controller 120 is wired to receive sensor data from (at least one) virtual sensor defined by sensor control device 200. Light controller 120 is unware of the fact that it receives sensor information, not from physical sensors but from virtual sensors. This allows an existing light control network to be upgraded without needing to replace the existing luminaires and/or light controllers.

For example, in an embodiment, the multiple luminaires are organized in multiple control zones. Luminaires of the connected lighting system are assigned to a control zone for joint control of the luminaires in the control zone. Normally, each luminaire is assigned to one and only one control zone. Control of at least one of the control zones is dependent upon the virtual sensor(s). The latter is most conveniently done using a light controller such as controller 120 as intermediary. Lighting controller 120 may be a lighting controller device. More complicated control mappings may use multiple virtual sensors.

For example, the lighting controller 120 may be configured to actuate at least part of the luminaires. Lighting controller 120 has a sensor input configured to receive sensor values. Sensor control device 200 is arranged to provide the sensor input with sensor values, at least one of which is a sensor value computed for a virtual sensor. Virtual and non-virtual sensor values may be mixed. For example, the non-virtual sensor may be directly obtained from a physical sensor.

Lighting controller 120 is configured with a control mapping indicating the assignment of luminaires to control zones and the dependence of luminaires in a control zone to sensor values received at the input.

Figure 2:
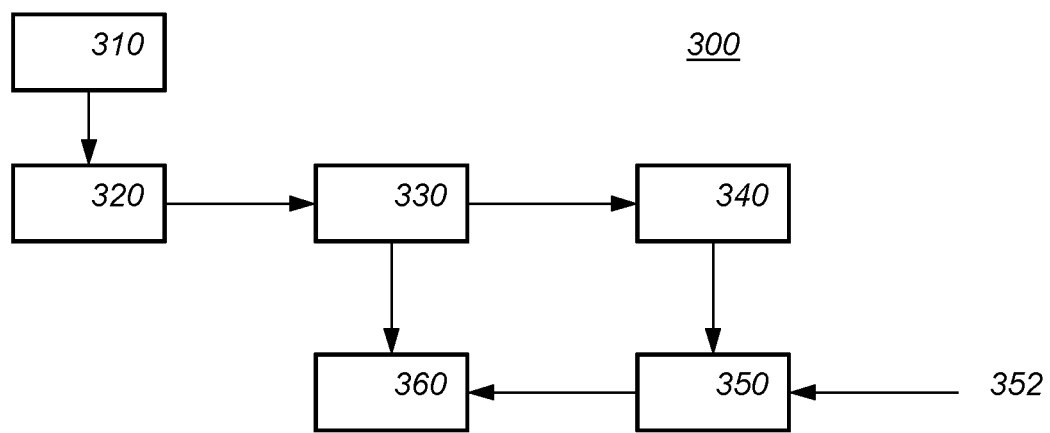

FIG. 2 schematically shows an example of an embodiment of a control process. For example, a control process according to FIG. 2 may be executed using the connected lighting network of FIG. 1.

FIG. 2 shows a closed-loop version of a lighting controller. It takes as inputs the illuminance value of the virtual sensor and an illuminance set-point for that location; the set-point may be defined based on the occupancy status. The latter may also be obtained from a virtual sensor. For example, a higher illuminance level, e.g., corresponding to 500 lux over a workspace, may be defined if there is occupancy, and a lower level, say, corresponding to 300 lux over a workspace, may be defined if there is no occupancy, but occupancy in a neighboring set of locations. The lighting controller may be a PID-type lighting controller (proportional-integral-derivative controller or PID) or a variant thereof. The output of this controller is a dimming level that is used to actuate corresponding luminaire(s).

FIG. 2 shows at 310 a virtual occupancy status, e.g., obtained from a sensor control device. At 320 the virtual occupancy status is used to define a set-point for a location, e.g., a sub-region in the region. At 360 a virtual illumination value is obtained, e.g., also from a sensor control device, possibly the same sensor control device. Box 330 represents lighting control, wherein light is controlled on the basis (possibly in part) of the illumination difference between the set-point and the virtual illumination value. This results in an actuation 340 of one or more luminaires. For example, an output of controller 330 may be a dimming level. At 350 the output of the luminaires is changed, probably increased, because of daylight and/or other light sources. This in turn will lead to an updated value for the virtual illumination sensor, which in turn may lead to a change in the actuation of the luminaire.

Shown in FIG. 2 is thus a lighting controller receiving as input a set-point determined form a virtual occupancy sensor, and a virtual sensor illuminance value. Based on these the luminaires are actuated. As a result, the values of the virtual sensors are updated. These in turn may lead to further adaptation of the luminaires. Instead of a set-point, the occupancy value could also be directly input to the lighting controller. Note that lighting controller in FIG. 2 may be oblivious to the fact that virtual sensors are used instead of physical sensors. The set-point may be set by light controller based on received occupancy input. Alternatively, the set-point may be determined by the sensor control device and provided to the lighting controller, possibly instead of the occupancy information itself.

FIG. 3 schematically shows an example of an embodiment of a connected lighting system 101. The connected lighting system of FIG. 3 is similar to that of FIG. 1. Important differences are discussed below.

The sensor controller device 200 of FIG. 3 has an additional component, a luminaire location storage 248. Luminaire location storage 248 is configured to store a location for the multiple luminaires, e.g., for each of the multiple luminaires. Sensor controller device is arranged to select a luminaire from the multiple luminaires having an illumination coverage comprising the virtual sensor location.

In other words, sensor controller device 200 of FIG. 3 also allows the definition of a virtual sensor, e.g., using virtual sensor location storage 246, but in addition can select one or more luminaires that may be used to illuminate that location.

For example, a luminaire from the luminaire location storage 248 that is close to the virtual sensor location. For example, the illumination coverage of the selected luminaire may comprise the virtual sensor location.

The illumination coverage of a luminaire may be defined as an area in which the light intensity is at least a predetermined percentage of the total light intensity, say, at least 90% or at least 80%, etc.

For example, a virtual sensor unit 270 may define a virtual sensor as in FIG. 1, but light controller output 280 may select a luminaire from luminaire location storage 248 to control, e.g., one or more luminaires close to the virtual sensor location. If multiple virtual sensor locations are defined light controller output 280 may select multiple luminaires for the multiple virtual sensors.

Instead of selecting a luminaire near a virtual sensor, one may also select a virtual sensor near a luminaire. For example, the virtual sensor location may be selected in the illumination coverage around a luminaire. For example, in an embodiment according to the latter, one may simulate conventional lighting networks in which each luminaire has its own integrated sensors for occupancy and/or illumination. Interestingly, one may use conventional lighting controllers that expect each luminaire to have its own sensor, yet in reality use luminaires without any sensors, e.g., replacing them with virtual sensors.

The virtual sensor values may be used to control the selected luminaire. In both cases one may define control zones, and assign virtual sensors to control zones as desired. In an embodiment, a virtual sensor is also assigned a virtual sensor id, which may be used in the control mapping. The virtual sensor id may be reported to a lighting controller together with the virtual sensor values.

As will be illustrated below, sensor control device may be used to refactor existing lighting networks with great flexibility without the need to invest in new luminaires and lighting controllers. However, virtual sensors according to the invention may be used for different applications. For example, sensor control device 200 according to FIG. 3 may be configured for a system in which control zones are dynamically assigned. For example, this dynamic configuration may be performed by a luminaires output unit 280.

For example, sensor control device 200 may be arranged to select from the integrated occupancy map an area in which the integrated occupancy map indicates occupancy. For example, a clustering algorithm may be applied to the integrated occupancy map. The clustering algorithm may for example combine the Matlab 'imdilate' command with the 'bwlabel' command. More advanced embodiments may use, say, the k-means clustering algorithm.

Once clusters of individuals are computed, a virtual sensor location is selected in the area for the virtual sensor. Multiple sensors may also be defined for a cluster. Also, luminaires are selected having a position in or near the area from a luminaire position database 248. Having one or more virtual sensors and one or more luminaires a control mapping is defined in which a control zone comprises the selected luminaires, and in which the control zone is controlled by the virtual sensor or sensors. The lighting system is then configured with the control mapping. For example, the control mapping may be uploaded to a lighting controller, such controller 120. The effect is that a control zone is created especially for the location where individuals happen to be located at the moment.

FIGS. 4, 5, and 6 explain various configurations and/or uses of embodiments of lighting control networks and/or sensor control device according to the invention. These examples are all shown in an open office in which multiple office workers may work. The examples may be adapted for other lighting situations.

Figure 4A:
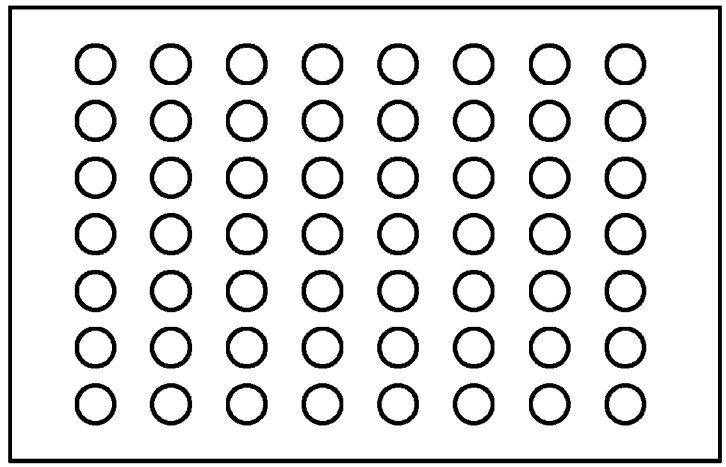
Figure 4B:
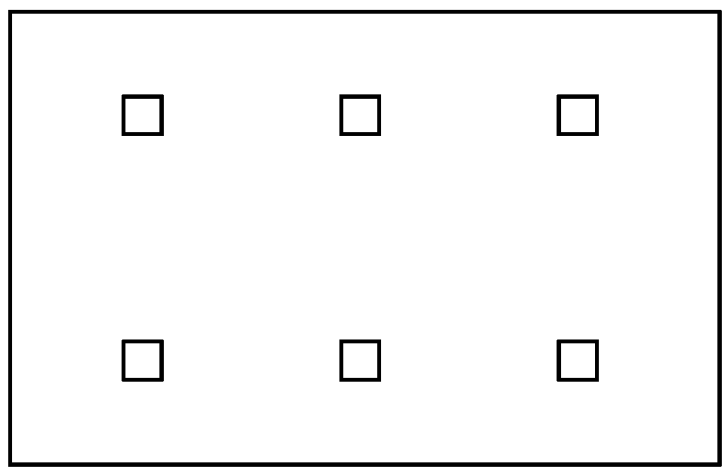
Figure 4C:
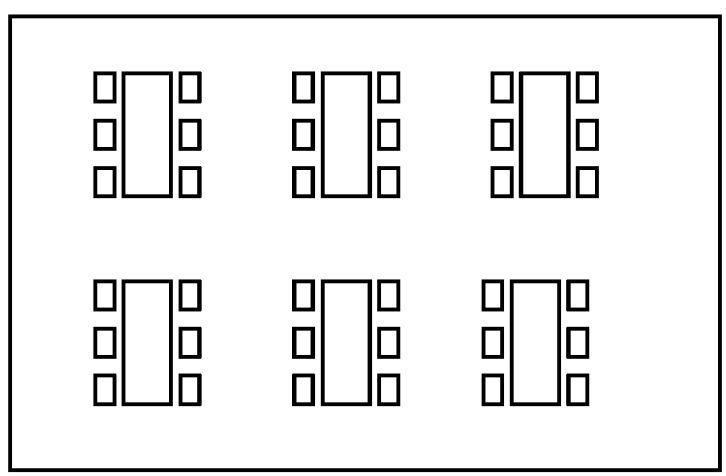
Figure 4D:
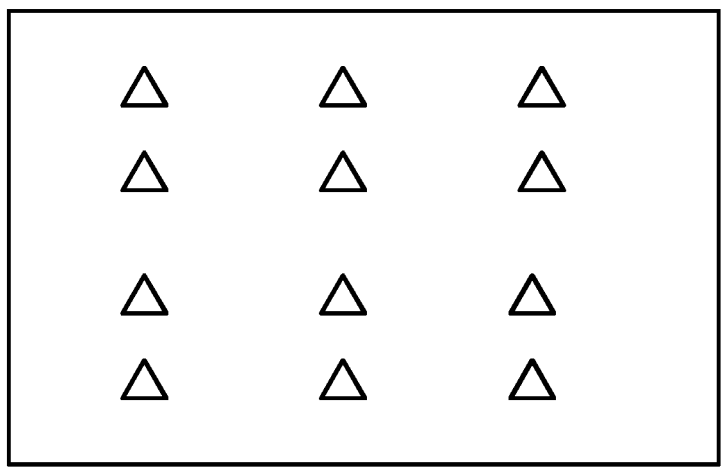
Figure 4E:
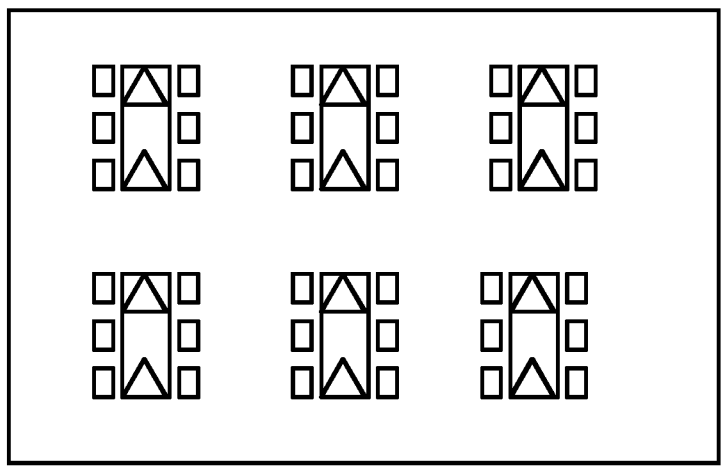

In FIG. 4*a*, the luminaires in the office space are schematically shown as small circles. In FIG. 4*b*, the sensors, e.g., multi-modal sensors are schematically shown as small squares. Note that the number of sensors is much smaller than the number of luminaires. FIG. 4*c* shows a schematic example of office furniture. Multiple desks and chairs are shown. Using the sensors of FIG. 4*b*, a number of virtual sensors are defined. The virtual sensor locations are shown in FIG. 4*d*. FIG. 4*e* shows an overlay of FIGS. 4*c* and 4*d*. Note that the virtual sensors are defined exactly at the locations that they are needed, irrespective of the locations that the physical sensors happen to have.

Figure 4F:
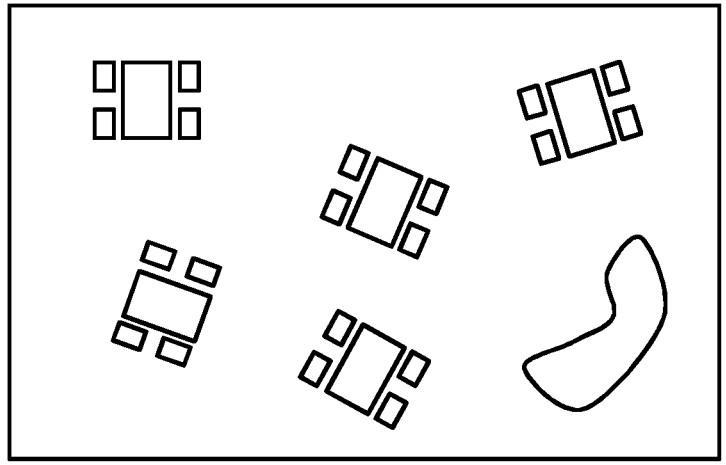
Figure 4G:
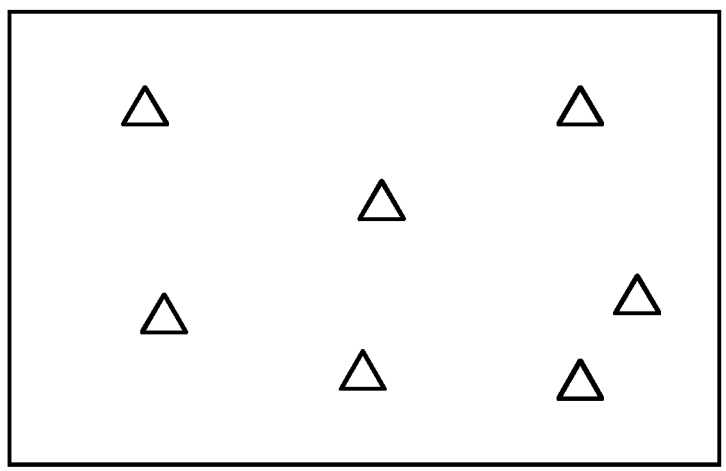
Figure 4H:
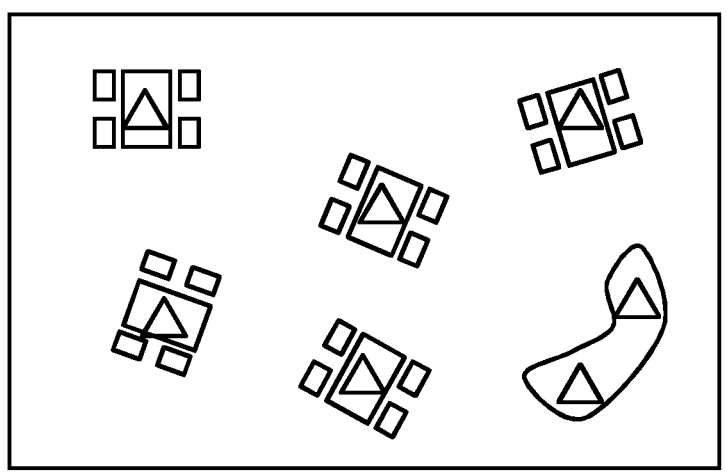

At some point the office space is re-arranged, say because a new company moved into the building. The existing lighting infrastructure is retained, including the luminaires of FIG. 4*a*, and the sensors of FIG. 4*b*. Light controllers may also be retained, although they may be reconfigured. FIG. 4*f* schematically shows the new office furniture. Note that the furniture has different dimensions and locations. FIG. 4*g* shows new virtual sensor locations. For example, the new virtual sensor locations may be uploaded into the virtual sensor location storage 246. FIG. 4*h* shows an overlay of FIGS. 4*f* and 4*g*. Note that the new virtual sensors are advantageously arranged as is suitable for the new arrangement shown in FIG. 4*f*. The lighting controllers can be arranged to use the virtual sensors defined with respect to FIG. 4*g* and an appropriate control mapping. The control mapping is not shown in these figures. The lighting networks is thus able to adapt to the new situation in the open office without physical rearrangement, only a reconfiguration of the sensor control device and the lighting controllers is needed.

The position of the virtual sensors may be determined by a human operator. Furthermore, for the scenarios in FIGS. 4*a*-4*h*, control zones are not indicated, however, the suitable sets of lights can be assigned to the virtual sensors as desired. Determining a control mapping may be done by hand, but may also be done automatically. For example, luminaires may be controlled by the virtual sensors that are closest to it.

Figure 5A:
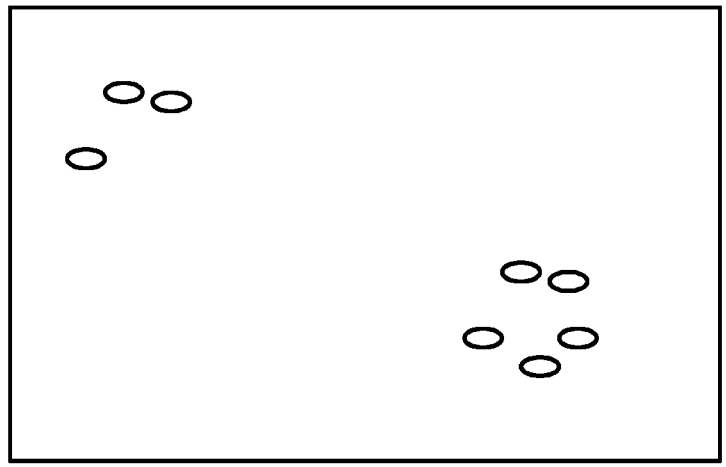
Figure 5B:
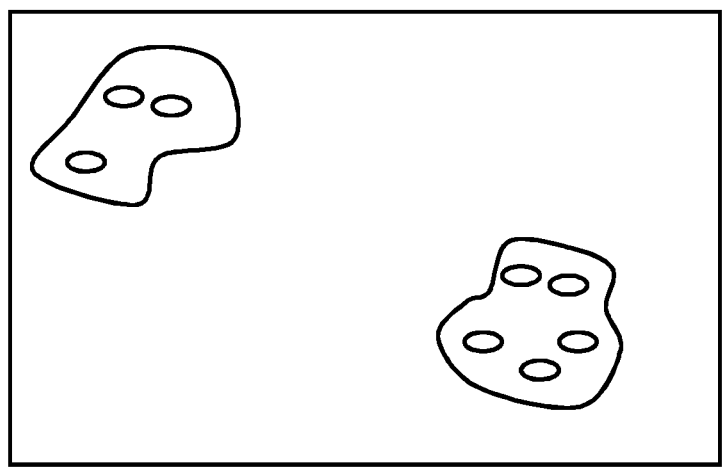
Figure 5C:
Figure 5D:
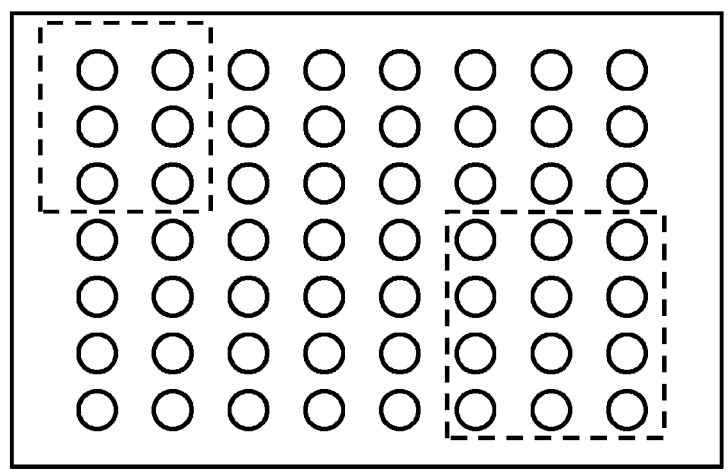

FIG. 5*a* schematically shows an example of an embodiment of an integrated region-wide occupancy map. In these figures, the detected individuals are indicated with a small oval. For example, the sensors of FIG. 4*b* may be used to generate the integrated map of FIG. 5*a*. A clustering algorithm is applied to the map of FIG. 5*a*. The result is schematically shown in FIG. 5*b*—two clusters have been found. The clusters are schematically indicated with an undashed line. Next the sensor control device can assign virtual sensors to the detected clusters. In this case, two sensors are assigned, using a single sensor is also possible, or more than two. The virtual sensor or sensors are configured for occupancy as well as for illumination. Next luminaires are selected that are close to the cluster. For example, one may use as a rule that only luminaires are selected that still provide say x % of their light at the location of a virtual sensor. X % may be say 50 or 80%. In FIG. 5*d* two control zones are indicated with a dashed line. The virtual sensors are assigned to their corresponding control zones. The control zones are then uploaded to a lighting controller. In an embodiment according to these principles, the assignment of virtual sensors and control zones may be fully automated.

The effect is that the individuals receive light controlled by occupancy and in particular by illumination, even though this particular assignment of control zones was not anticipated in advance.

Figure 6A:
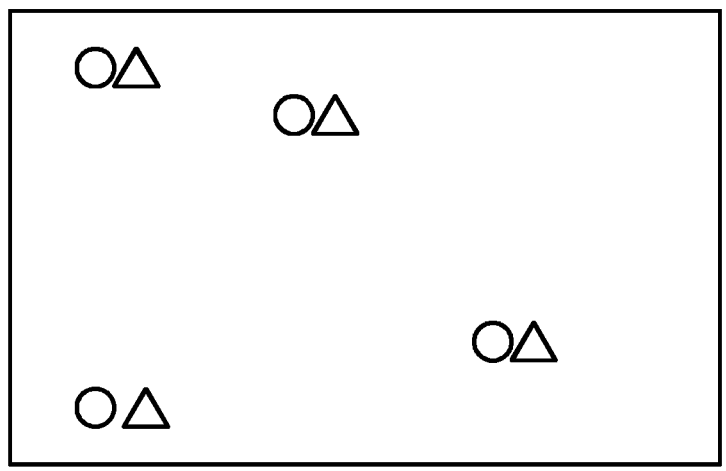
Figure 6B:
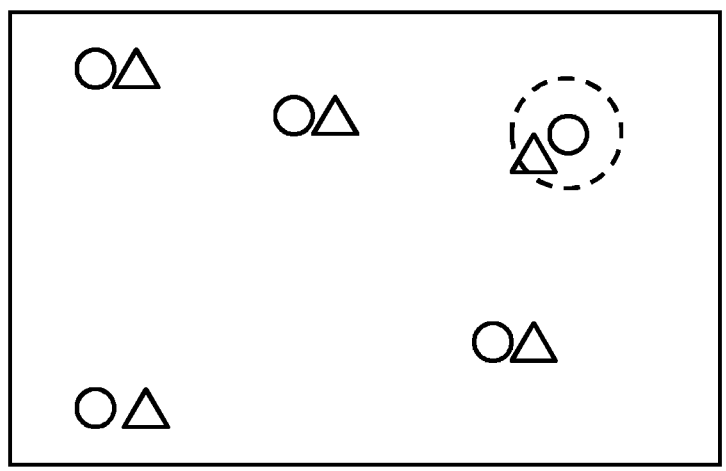

FIG. 6a schematically shows an example of an embodiment of virtual sensors and luminaires in an open office space. Here the system is used to simulate luminaires with an integrated sensor, by selecting the virtual sensor locations to the same as the physical locations of the luminaires. In FIG. 6b, a luminaire is added to the system. Indicated with a dashed line in FIG. 6b is the illumination coverage of the new luminaire. For example, one may define the illumination coverage as the area where the luminaire still has 80% of its intensity. The virtual sensor is selected at a point in the illumination coverage. The location could have been chosen to be identical to the luminaire location, but as shown, this is not necessary.

In the various embodiments of the sensor control device, the receiving unit may comprise an input interface which may be selected from various alternatives. For example, the input interface may be a network interface to a local or wide area network, e.g., the Internet, an application interface (API), etc.

The sensor control device may have a user interface, which may include well-known elements such as one or more buttons, a keyboard, display, touch screen, etc. The luminaires may also have a user interface. The user interface may be arranged for accommodating user interaction for changing lighting at a particular location, or at a particular luminaire, etc. The user interface may be arranged for accommodating user interaction to obtain information from the sensor control device, e.g., obtain virtual sensor information, e.g., on a display connected to the sensor control device.

The various storages, such as the physical sensor location storage 242, map storage 244, virtual sensor location storage 246, and luminaire location storage may be implemented as an electronic memory, say a flash memory, or magnetic memory, say hard disk or the like. The storages may also be implemented as application interfaces to offsite storage, e.g., cloud storage. The storages may comprise multiple discrete memories together making up the storages. The storages may also be a temporary memory, say a RAM. In the case of a temporary storage, the sensor control device contains some means to obtain data before use, say by obtaining them over an optional network connection (not shown), e.g., from a cloud storage.

Typically, the sensor control device 200, the luminaires, and the lighting controller each comprise a microprocessor (not separately shown) which executes appropriate software stored at the sensor control device 200; for example, that software may have been downloaded and/or stored in a corresponding memory, e.g., a volatile memory such as RAM or a non-volatile memory such as Flash (not separately shown). Alternatively, the sensor control device 200, the luminaires, and the lighting controller may, in whole or in part, be implemented in programmable logic, e.g., as field-programmable gate array (FPGA). The devices may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, the sensor control device 200 may comprises a receiving circuit, an input circuit, sensor data aggregation circuit, a physical sensor location storage circuit, a map storage circuit, a virtual sensor location storage circuit, a luminaire location storage circuit, a virtual sensor circuit, a light controller circuit. The circuits implement the corresponding units described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

In an embodiment, a connected lighting system is provided with multiple luminaires and sensors, where lighting data is collected in a backend database or cloud. A lighting system may use multiple sensor inputs, e.g., in the form of occupancy and light measurements, to control the light output of the luminaires and adapt artificial lighting conditions to prevalent environmental conditions. The system may use advanced sensors such as vision sensors and other systems like indoor positioning systems in conjunction with the lighting systems. Such sensing systems may generate output in multiple modes. For instance, a vision sensor does not need to act solely as a binary occupancy sensor, but can provide illuminance levels and user positions within its sensing region. The multi-modal sensor data may be used to actuate the luminaires in the lighting system.

The multi-modal sensors need not be part of the lighting system in the traditional sense. They may be installed, and maintained separately from the luminaires.

In an embodiment, the system has multiple multi-modal sensors, e.g., vision sensors, over an indoor space such as an open office. Each sensor generates data in the form of user positions and illuminance value for cells within its sensing region. The cells may be at a pre-defined spatial granularity. This data may be reported to a sensor data aggregator along with the sensor ID and timestamp.

Figure 8:
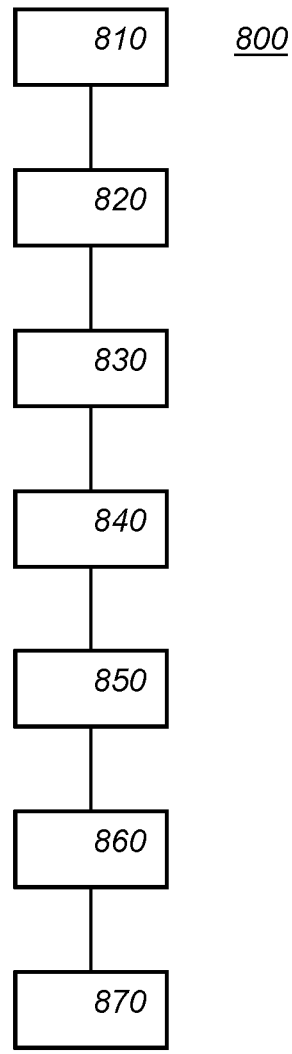

FIG. 8 schematically shows an example of an embodiment of a sensor control method 800. The sensor control method 800 is arranged for a connected lighting system, e.g., such as system 100 or 101. The connected lighting system comprises multiple luminaires arranged in a region. Sensor control method 800 comprises receiving 810 sensor data from multiple sensors arranged in the region, each sensor being associated with a sub-region comprised in the region, the sensor data being indicative of one or more occupant locations of occupants in the sub-region and/or multiple illuminance levels at multiple different points in the sub-region, storing 820 a virtual sensor location in the region of a virtual sensor for occupancy and/or illuminance, obtaining 830 from the received sensor data the occupant locations in the sub-region associated with the sensor data and/or the multiple illuminance levels for the multiple points in the sub-region associated with the sensor data, converting 840 the occupant locations and/or multiple points in the sub-regions to region-wide coordinates and integrate 850 occupancy states for the multiple occupant locations and/or the multiple illuminance levels for the multiple points into an integrated region-wide occupancy and/or illuminance map, defining 860 a virtual sensor at the virtual sensor location and compute an occupancy state and/or illuminance level for the virtual sensor from the virtual sensor location and the integrated occupancy and/or illuminance map, using 870 the occupancy state and/or illuminance level from the virtual sensor to control a luminaire of the multiple luminaires, the luminaire covering the virtual sensor location in the region.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 830 and 840 may be executed, at least partially, in parallel. Moreover, a given step may not have finished completely before a next step is started.

A method according to the invention may be executed using software, which comprises instructions for causing a processor system to perform method 800. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 9A:
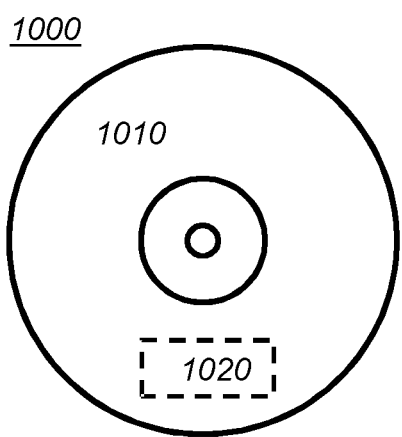

FIG. 9a shows a computer readable medium 1000 having a writable part 1010 comprising a computer program 1020, the computer program 1020 comprising instructions for causing a processor system to perform a sensor control method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said sensor control method.

Figure 9B:
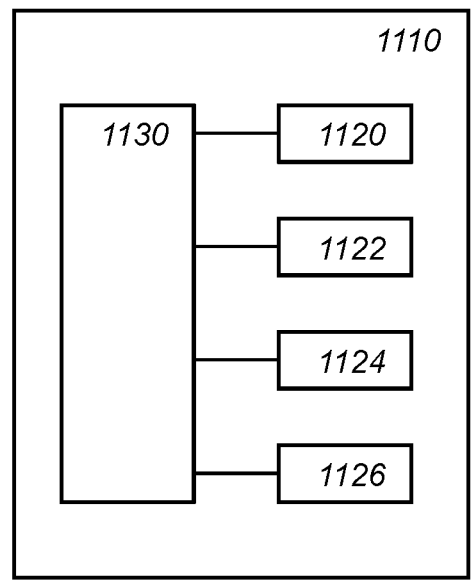

FIG. 9b shows in a schematic representation of a processor system 1140 according to an embodiment. The processor system comprises one or more integrated circuits 1110. The architecture of the one or more integrated circuits 1110 is schematically shown in FIG. 9b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the sensor control device may comprise a processor circuit and a memory circuit, the processor being arranged to execute software stored in the memory circuit. For example, the processor circuit may be an Intel Core i7 processor, ARM Cortex-R8, etc. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

LIST OF REFERENCE NUMERALS IN FIGS. 1 AND 3

100, 101 a connected lighting system
120 a light controller
122 multiple luminaires
124 multiple physical sensors
200 a sensor control device
210 a receiving unit
220 an input unit
230 sensor data aggregation unit.
242 a physical sensor location storage
244 a map storage
246 a virtual sensor location storage
248 a luminaire location storage
270 a virtual sensor unit
280 a light controller output

The invention claimed is:

1. A sensor control device for a connected lighting system, said connected lighting system comprising multiple luminaires arranged in a region, the sensor control device comprising
   a receiving unit arranged to receive sensor data from multiple sensors arranged in the region, each sensor being associated with a sub-region comprised in the region, the sensor data being indicative of one or more occupant locations of occupants in the sub-region and/or multiple illuminance levels at multiple different points in the sub-region,
   a virtual sensor location storage storing a virtual sensor location in the region of a virtual sensor for occupancy and/or illuminance,
   a processing unit arranged to
      obtain from the received sensor data the occupant locations in the respective sub-region associated with the sensor data and/or the multiple illuminance levels for the multiple points in the respective sub-region associated with the sensor data,
      integrate occupancy states for the multiple occupant locations and/or the multiple illuminance levels for the multiple points into an integrated region-wide occupancy and/or illuminance map,
      define a virtual sensor at the virtual sensor location and compute an occupancy state and/or illuminance level for the virtual sensor from the virtual sensor location and the integrated occupancy and/or illuminance map,
      use the occupancy state and/or illuminance level from the virtual sensor to control a luminaire of the multiple luminaires, the luminaire covering the virtual sensor location in the region.

2. The sensor control device as in claim 1, wherein the processing unit is arranged to
   convert the occupant locations and/or multiple points in the sub-regions from sub-region-wide coordinates to region-wide coordinates before integrating the occupancy states for the multiple occupant locations and/or the multiple illuminance levels for the multiple points.

3. The sensor control device for a connected lighting system as in claim 1, comprising
   a luminaire location storage storing a location for the multiple luminaires, the processing unit being arranged to select a luminaire from the multiple luminaires having an illumination coverage comprising the virtual sensor location.

4. The sensor control device for a connected lighting system as in claim 1, wherein the virtual sensor location is selected in an area around a luminaire, the area being defined as the area in which the light intensity of the controlled luminaire contributes at least a predetermined percentage of the total light intensity at the virtual sensor location.

5. The sensor control device for a connected lighting system as in claim 1, wherein the sensor data comprises a sequence of sub-region-wide coordinates indicating the occupant locations and/or of illuminance levels for the multiple points, occupant locations and/or points being relative to the sensor.

6. The sensor control device for a connected lighting system as in claim 1, wherein at least one of the multiple sensors is a multi-modal sensor arranged to provide sensor data indicative for multiple distinct occupant locations and for multiple distinct illuminance levels at multiple different points in the sub-region.

7. The sensor control device for a connected lighting system as in claim 1, wherein a first and second sub-region which are associated with a first and second sensor overlap, the processor being arranged to integrate occupancy status and/or illuminance sensor values of points in the overlapping part of the first and second region by applying a consolidation routine arranged to consolidate the sensor data in the overlapping part of the first and second sub-region.

8. The sensor control device for a connected lighting system as in claim 1, wherein the processor circuit is arranged to
   compute an occupancy state from the virtual sensor location and the integrated occupancy map for the region, by selecting from the integrated map occupancy states obtained for points in a further sub-region around the virtual sensor location, the virtual sensor being assigned an occupied state if any one of the selected occupancy states indicates occupancy, and/or
   compute an illuminance level from the virtual sensor location and the integrated illuminance map for the region, by obtaining from the integrated map illuminance levels obtained for points in a further sub-region around the virtual sensor location, the virtual sensor being assigned an illuminance level by interpolating from the selected illuminance levels.

9. The sensor control device for a connected lighting system as in claim 1, wherein the lighting system is configured with multiple control zones, luminaires of the connected lighting system being assigned to a control zones for joint control of said luminaires, control of at least one of the control zones being dependent upon the virtual sensor.

10. The sensor control device for a connected lighting system as in claim 9, wherein the lighting system comprises a lighting controller configured to actuate at least part of the luminaires, the lighting controller having a sensor input configured to receive sensor values, the lighting controller being configured with a control mapping indicating the assignment of luminaires to control zones and the dependence of luminaires in a control zone to sensor values received at the input, the processor circuit of the sensor control device being arranged to provide the sensor input with sensor values, at least one of which is a sensor value computed for a virtual sensor.

11. The sensor control device for a connected lighting system as in claim 9, wherein the processor circuit is arranged to
   select from the integrated occupancy map an area in which the integrated occupancy map indicates occupancy,
   select a virtual sensor location in the area for the virtual sensor,
   select luminaires having a position is in or near the area from a luminaire position database,
   define a control mapping in which a control zone comprises the selected luminaires, and in which the control zone is controlled by the virtual sensor,
   configure the lighting system, e.g., a lighting controller, with the control mapping.

12. A connected lighting system comprising the sensor control device as in claim 1, the connected lighting system comprising
   multiple sensors arranged in the region, each sensor being associated with a sub-region comprised in the region, and comprising a transmitter for sending sensor data to the sensor control device, the sensor data being indicative of one or more occupant locations of occupants in the sub-region and/or multiple illuminance levels at multiple different points in the sub-region, multiple luminaires arranged in the region, the luminaires comprise a receiver for receiving luminaire actuation commands from the lighting system.

13. A sensor control method for a connected lighting system, said connected lighting system comprising multiple luminaires arranged in a region, the sensor control method comprising receiving sensor data from multiple sensors arranged in the region, each sensor being associated with a sub-region comprised in the region, the sensor data being indicative of one or more occupant locations of occupants in the sub-region and/or multiple illuminance levels at multiple different points in the sub-region, storing a virtual sensor location in the region of a virtual sensor for occupancy and/or illuminance, obtaining from the received sensor data the occupant locations in the respective sub-region associated with the sensor data and/or the multiple illuminance levels for the multiple points in the respective sub-region associated with the sensor data, converting the occupant locations and/or multiple points in the sub-regions to region-wide coordinates and integrate occupancy states for the multiple occupant locations and/or the multiple illuminance levels for the multiple points into an integrated region-wide occupancy and/or illuminance map, defining a virtual sensor at the virtual sensor location and compute an occupancy state and/or illuminance level for the virtual sensor from the virtual sensor location and the integrated occupancy and/or illuminance map, using the occupancy state and/or illuminance level from the virtual sensor to control a luminaire of the multiple luminaires, the luminaire covering the virtual sensor location in the region.

14. A non-transitory computer readable medium storing instructions to cause one or more computer processors to perform the method according to claim 13.

* * * * *